Aug. 27, 1963   B. E. GRAN ET AL   3,102,048
MAGNETIC FILMS
Filed Nov. 14, 1960

INVENTORS.
BURTON E. GRAN
JAMES O. HOLMEN
RICHARD J. PROSEN

BY

ATTORNEY

United States Patent Office 3,102,048
Patented Aug. 27, 1963

3,102,048
MAGNETIC FILMS
Burton E. Gran and James O. Holmen, St. Louis Park, and Richard J. Prosen, Edina, Minn., assignors to Minneapolis-Honeywell Regulator Company, Minneapolis, Minn., a corporation of Delaware
Filed Nov. 14, 1960, Ser. No. 68,847
6 Claims. (Cl. 117—61)

The present invention relates to thin magnetic films having unique magnetic properties and to the method of producing these films. More particularly, the present invention is directed to a thin magnetic film which possesses the property which we have called "rotatable anisotropy."

It has been known for some time that thin films of magnetic metals could be prepared by vacuum deposition techniques. The interest in these thin films had been motivated by the desirable properties believed to exist in these films. These desirable properties include low eddy current losses and the prospect of concentrating high total magnetic energy into correspondingly small volume. The low eddy current losses are desirable for the purpose of allowing a larger number of reversals per unit time without excessive heating of the film. A further advantage in the use of thin magnetic films is the relative resistance to heating effects of metal magnetic films as compared to magnetic oxide films. The magnetic oxide films currently in use generally have an upper temperature limit of 50° C. The metal films on the other hand can be used at considerably higher temperatures, as high as perhaps 300° C. Metal films known to date have possessed to a greater or lesser degree certain desirable magnetic properties found useful in computers and the like. However, the uniformity of these films from area to area of individual films as well as the uniformity in the film from batch to batch have left much to be desired. A number of investigations have been made to provide the uniformity desired. These investigations have resulted in the production of metallic thin films showing rectangular hysteresis loops and in films having the easy direction of magnetization aligned generally along the desired axis. This alignment has been brought about through the use of a magnetic field along the substrate the film is being deposited on during deposition. However, the films so produced have not uniformly shown the desired alignment and in many instances it is desirable to be able to realign these films following deposition. To date the only method by which these films may be aligned, insofar as is known to us, is through the use of a temperature anneal under a magnetic field.

The present invention is an improvement over the prior state of the art as it produces a thin magnetic film possessing rectangular hysteresis loops, and further, the easy direction of magnetization may be changed as desired at room temperature by a simple magnetic anneal.

Therefore, it is the object of the present invention to provide a thin metallic film by evaporative metal techniques, said film possessing the property of rotatable anisotropy. Another object of this invention is to provide a method of producing the metallic film possessing rotatable anisotropy. By rotatable anisotropy is meant a property of a metal film showing magnetic anisotropy, said anisotropy being realignable by a genuine magnetic anneal. That is, the film may be annealed by means of a magnetic field at temperatures at least as low as −195° F. and the rate does not appear to be temperature dependent.

Other objects and advantages to the present invention will be apparent from a study of the following drawings and specifications wherein.

The film of the invention possesses a normal hysteresis loop. By normal is meant a film which has a moderately rectangular hysteresis loop when driven along the direction of easy magnetization and an almost linear lossless hysteresis loop in the planar direction normal to the easy axis.

We have found that a thin vapor deposited film of 80±3% nickel, balance iron, can be produced which possesses both a square hysteresis loop in the easy direction and also is magnetically annealable at room temperature to allow realignment of the easy direction of magnetization.

Figure 1:
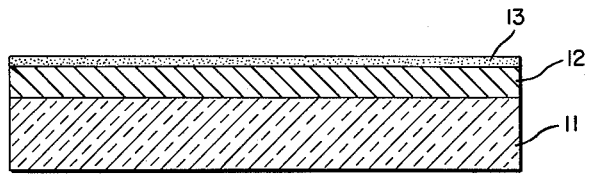
FIGURE 1 is a schematic representation of a film and substrate of the invention.
Figure 2:
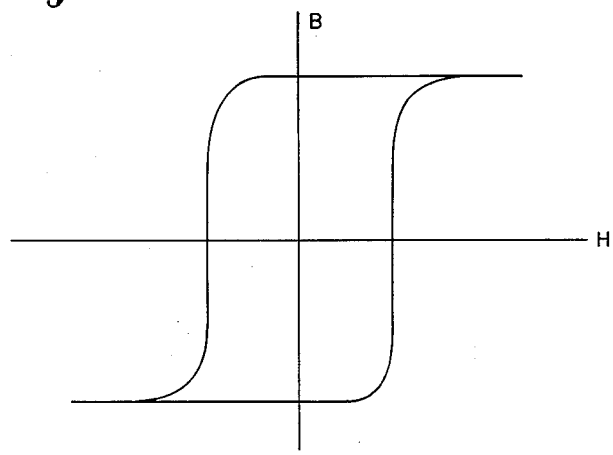
FIGURE 2 is a graph showing a typical hysteresis loop of the material of the invention in the easy direction of magnetization.
Figure 3:
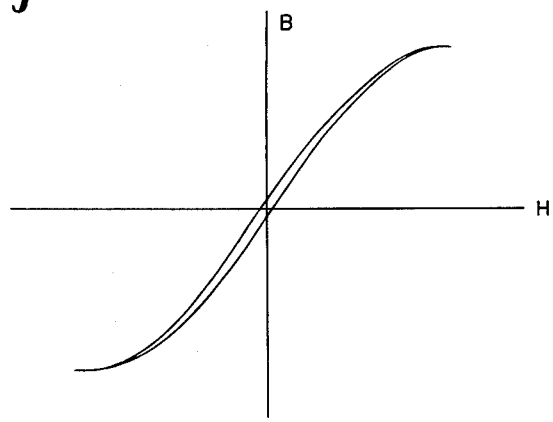
FIGURE 3 is a graphical representation of a typical hysteresis loop of the material of the present invention along the axis of the hard direction of magnetization.

Experimental evidence has been accumulated which indicates that an underlying factor in the latter property is the presence of an oxide layer in these films. In films of approximately 2800 angstroms thickness the oxide layer, which is approximately 150 angstroms thick, is at the surface of the deposited metal. Referring now to FIGURE 1 it is seen that the material of the invention consists of a base or substrate 11, a composite nickel and iron deposit 12, and a surface layer of oxides 13. The deposit of metal identified 12 is deposited by conventional vacuum metal techniques from a crucible containing the appropriate nickel-iron composition. The limits of the melt composition are not critical as long as the deposited film has the proper composition. In a preferred form of the invention the deposit itself will have a composition of 80% nickel, 20% iron. Films of this composition are well known in the art under the name Permalloy. The substrate 11 of the invention can be glass or a nonmagnetic metal, or other nonmagnetic materials capable of being adequately cleaned to produce a suitable surface for deposition. We have found that best results are obtained when the deposit is made on a thin copper film over glass. The surface of the substrate must, of course, be free of flaws, scratches, and the like which would produce undesirable stresses and/or crystal imperfections in the deposited metal. The oxide layer 13 may be produced by various techniques. The nature of the oxide layer 13 is not fully understood. From X-ray diffraction studies it appears that the oxide layer may be said to be unambiguously nickel oxide possibly combined with various quantities of iron oxide and some metallic nickel. As is well known in the art, the iron oxide preferentially oxidizes before nickel leaving "island" of nickel metal. The nickel metal then subsequently oxidizes to nickel oxide. The transistion from the matrix metal alloy of nickel-iron to the oxide layer of nickel-oxide, nickel, and iron-oxide is not a sharp transition. However, this area is believed to be critical insofar as the production of the properties of the invention.

While we do not wish to be bound to any particular theory as to the cause of the property we have called rotatable anisotropy, the following explanation and experimental evidence appears to provide a satisfactory model of the invention.

Thin magnetic films produced by the methods of the invention and which show the property of rotatable anisotropy have been examined to determine the factors which react to produce the unique property. Films showing this property were determined to consist of a metallic matrix at least 2700 angstroms thick over the substrate consisting of glass or other nonmagnetic materials. Immediately contiguous with the metal matrix is a metal oxide layer approximately 150 angstroms in thickness. This layer of oxide was carefully removed through etching techniques to insure that only the oxide layer had been removed. Subsequent magnetic tests showed that the magnetic properties of the substrate had been destroyed insofar as the invention is concerned.

A second test on a film of the invention was performed which differed from the first in that an etch was performed from the matrix side of the oxide layer. A pressure sensitive tape was used to "lift" the deposited film from the substrate. Tests on the lifted film showed the magnetic properties to be unaffected. This shows that the substrate-matrix boundary does not enter into the property discovered. A significant quantity of the matrix metal was removed from the side opposite the oxide layer and the remaining film tested magnetically. It was found that the properties of the film were not significantly affected. The easy direction of magnetization was still rotatable by a magnetic field at room temperature. From these tests it has been inferred that certain inter-actions between the matrix metal and the oxide layer combine to produce the desired properties. These properties may be permanently destroyed if the film is heated to 350° C. or above. An additional property of the film is the importance of the thickness insofar as the rotatable anisotropy is concerned. Our tests have shown that a rotatable anisotropy appears as a property when the thickness of the film layer is in the vicinity of 2730 angstroms. When films have been produced in excess of this figure, as high as 7800 angstroms, it has been found that the film still possesses rotatable anisotropy. However, when the surface of the film is removed by etching techniques it is found that the rotatable anisotropy remains as a property until the film has been etched to a point of approximately 2730 angstroms. Thus, it would appear that there is some relationship between the oxide film and the thickness of the metal deposited. However, as noted above, the matrix metal may be removed from the opposite side of the oxide without destruction of the rotatable anisotropy. The precise reason for this phenomena is not understood, however, it is believed that an orientation of the domains of the film effectively takes place at a certain stage in the formation of the film. It is this orientation which produces the rotatable anisotropy.

As is noted in the previous discussion the property of rotatable anisotropy is believed due to the presence of an oxide layer at or in the surface of the deposited metal film in the vicinity of 2730 angstroms. This oxide film is critical in its method of formation in order to produce a wholly uniform deposit. That is, the desired properties will not be attained through the casual production of the oxide film. We have found that films may be produced which show a tendency toward rotatable anisotropy by more than one method although a preferred method is as given hereinbelow.

While the following example is believed to be the best mode of producing the film of the invention it is not the intent to be limited to this method of producing the film. Other methods which will be discussed briefly below also produce a film showing the general property of rotatable anisotropy, although to a lesser degree. In the preferred method of producing the film of the invention the deposit is made on a thin vacuum deposited layer of copper which is deposited on a glass microscope slide. As noted above, other materials such as silver, zinc, aluminum, and glass have also been successfully used in the production of the film. However, the deposit directly over copper over glass appears to produce the most useful film. The glass microscope slide is first fire polished to insure that it has no physical irregularities. It is then cleaned in an alkaline detergent such as Alconox, a proprietary solution of the Alconox Corporation of New York, New York. The slide is then rinsed in running tap water followed by a distilled water rinse and finally rinsed in high purity methyl alcohol. After air drying the slide is mounted in a suitable mask of aluminum and placed on a substrate heater in a bell jar. The bell jar is then evacuated and a film of copper is deposited onto the unmasked areas of the slide. Neither the thickness of the film of copper nor the time of its deposition is critical. That is, the film may be of various thicknesses and it may be deposited in a separate operation removed from the magnetic metal deposition. However, as a practical matter it is best to perform the copper deposition and the magnetic film deposition in the same chamber. Following deposition of the copper film the bell jar system is evacuated to approximately 50 microns of pressure with a range of 50 to 150 microns being permissible. The slide is heated by the substrate heater to approximately 350° F. A glow discharge is then initiated by a shielded A.C. discharge of 3500 volts, this discharge being continued for 3 to 5 minutes. This is for the purpose of removing as much of the absorbed gas as possible. The time of the glow discharge is limited only insofar as restricting the amount of heat generated by the power being put into the system. After the glow discharge cleaning period, the temperature of the slide is adjusted to approximately 250° F. Temperatures as high as 350° C. have been used without adverse effect. When temperatures in excess of 350° C. are used the deposit does not possess the properties of the film of the invention. As the temperature is adjusted to the desired figure, the chamber is evacuated down to $10^{-5}$ mm. of mercury and maintained for several minutes. Air or oxygen is admitted to raise the pressure of the system to approximately $10^{-3}$ mm. of mercury. This condition is maintained for approximately 3 minutes and then the pressure in the system is reduced again to $10^{-5}$ mm. of mercury. Heat is then applied to a crucible containing the desired nickel-iron alloy. The alloy is raised to 1600 to 1700° C. at which time metal is deposited on the sample. The rate of deposition is approximately 1500 angstroms per minute. A typical film will be from 3000 to 8000 angstroms in thickness. During the deposition an orientating field of 9 oersteds is maintained across the sample. The composition of the metal in the crucible is 83% nickel and 17% iron. Following deposition of the film the entire system is cooled down to room temperature under a field of 5 oersteds and upon reaching room temperature this system is returned to atmospheric pressure.

*Properties of Film Prepared as Above*

|  | Oersteds |
|---|---|
| $H_A$[1] (threshold magnitude) | ~ 30 |
| $H_K$ (anisotropy constant) | 4 to 150 |
| $H_C$ (coercive force) | 4 to 30 |

[1] By threshold magnitude is meant the drive field necessary to rotate the easy direction of magnetization. Value in excess of this value likewise will cause rotation of the easy direction of magnetization.

Output voltage of annealable films of the invention is approximately one-half that of non-annealable films of equal thickness. The reason for this difference is not presently known.

The presence of a magnetic field during the deposition is not necessary in order to secure the film of the invention. A film may be deposited without a magnetic field and orientated at a later date by the use of a suitable magnetic anneal. This feature permits the use of a simpler system during the deposition than has been used in the past. The film may be oriented either in situ or at any time following deposition. The property of rotatable anisotropy makes it possible to so deposit and orient a film.

The additional advantage of the method of the invention is that compositions of 77% nickel and 23% iron have been found usable to produce a useful magnetic film. In the past it has been necessary to maintain rather close control on the composition of the film. For example, one investigator, Rubens in 2,900,282 has set limits of 82.75% nickel ±.5% as the optimum composition for a magnetic film.

Experiments have been performed in an effort to determine whether the property of rotatable anisotropy could be produced, following deposition of the film, through controlled oxidation. As has been previously noted, the film is quite temperature sensitive and temperatures in excess of 350° C. permanently destroy the magnetic properties insofar as the invention is concerned. The property of rotatable anisotropy is likewise reversibly changed when the temperature is raised to 250° C. This latter temperature corresponds to the Neel temperature for nickel oxide. Of course, it is well known that the Curie temperature for nickel is approximately 350° C.

A film was deposited in the manner indicated above with the exception that the controlled introduction of oxygen into the system prior to deposition was not used. The film so produced was then oxidized in a controlled oxygen atmosphere at 150° C. for 4 hours. Tests of the magnetic properties both before and after the controlled oxidation showed that there had been some relaxation of the magnetic orientation but that rotatable anisotropy had not been produced. Likswise, deposited films of nickel-iron which had been allowed to slowly oxidize at room temperature have shown a relaxation of their magnetic properties. However, the easy direction of magnetization of these films does not become magnetically rotatable upon build up of an oxide.

A further experiment has been performed to establish the importance of the presence of the absorbed layer of oxygen resulting from introduction of air or oxygen into the vacuum system prior to deposition of the metal. All the conditions of the example given above were maintained with the exception that the introduction of oxygen was omitted following the glow discharge. Rather, an admission of nitrogen gas was made at this point. The film subsequently deposited failed to show any indication of having the property of rotatable anisotropy. This is believed to be additional proof of the importance of the presence of oxygen at this stage in the process.

We claim:

1. A method for producing a thin magnetic film possessing the property of rotatable anisotropy, said method comprising thoroughly outgassing a non magnetic substrate, producing an absorbed layer of oxygen on said substrate, maintaining said substrate at a temperature below 350° C. and in a vacuum of about $10^{-5}$ mm. of mercury pressure, evaporating a nickel-iron alloy having a composition such that a deposit will be produced consisting of from about 77% up to about 83% nickel, balance iron onto said substrate to form a film greater than 2700 A. thickness, said film being predominently metal and having on the surface thereof an oxide layer.

2. As an article of manufacture a substrate having on one surface thereof a thin metallic film possessing the property of rotatable anisotropy, said film being produced by the method of claim 1.

3. A method of producing a magnetic device possessing the property of rotatable anisotropy, said method comprising
   (A) Cleaning and degassing a nonmagnetic substrate by glow-discharge at approximately 3500 volts A.C. for from 3 minutes up to about 5 minutes while maintaining a pressure of from about 50 microns up to about 150 microns,
   (B) Adjusting the temperature of the substrate to from about 250° C. up to about 350° C. while reducing the pressure to about $10^{-5}$ mm. of mercury,
   (C) Admitting oxygen until the pressure of the system is approximately $10^{-3}$ mm. of mercury and maintaining this condition for approximately 3 minutes,
   (D) Again reducing said pressure of said system to about $10^{-5}$ mm. of mercury,
   (E) Depositing a nickel-iron film from a crucible maintained at from 1600° to about 1700° C., said crucible having a composition such that a deposit will be produced consisting of from 77% up to about 83% nickel, balance iron, said deposition continuing until the deposit is from about 2700 angstroms up to about 8000 angstroms in thickness.

4. The method of producing a magnetic device possessing the property of rotatable anisotropy in accordance with claim 3 wherein the nonmagnetic substrate is selected from the class consisting of glass, aluminum, magnesium, and copper.

5. As an article of manufacture a substrate having on one surface thereof a thin metallic film possessing the property of rotatable anisotropy, said film being produced by the method of claim 3.

6. A method of producing a magnetic device possessing the property of rotatable anisotropy, said method comprising degassing a nonmagnetic substrate by glow-discharge while under vacuum, heating the substrate to approximately 250° C. while maintaining a pressure of $10^{-5}$ mm. of mercury, raising the pressure of the system to approximately $10^{-3}$ mm. of mercury by admission of oxygen and maintaining this condition for 3 minutes, again reducing the pressure of said system to $10^{-5}$ mm. of mercury, and vacuum depositing nickel-iron metal to form a thin film having a composition of from about 77% up to about 83% nickel, balance iron in a deposit in excess of about 2700 angstroms thickness.

References Cited in the file of this patent

UNITED STATES PATENTS

| | | |
|---|---|---|
| 2,900,282 | Rubens | Aug. 18, 1959 |
| 2,914,428 | Ruckelshaus et al. | Nov. 24, 1959 |
| 2,996,418 | Bleil | Aug. 15, 1961 |